United States Patent
Ramirez Sanchez et al.

(10) Patent No.: US 12,015,276 B2
(45) Date of Patent: Jun. 18, 2024

(54) SYSTEM AND METHOD FOR PRE-CHARGING A DC LINK OF A POWER CONVERTER

(71) Applicant: General Electric Company, Schenectady, NY (US)

(72) Inventors: Fernando Arturo Ramirez Sanchez, Salem, VA (US); Robert Gregory Wagoner, Roanoke, VA (US); Zane Taylor Miller, Christiansburg, VA (US); Steven Wade Sutherland, Roanoke, VA (US)

(73) Assignee: GE Infrastructure Technology LLC, Greenville, SC (US)

( * ) Notice: Subject to any disclaimer, the term of this patent is extended or adjusted under 35 U.S.C. 154(b) by 135 days.

(21) Appl. No.: 17/673,139

(22) Filed: Feb. 16, 2022

(65) Prior Publication Data

US 2023/0261473 A1     Aug. 17, 2023

(51) Int. Cl.
*H02J 3/36* (2006.01)
*H02J 3/12* (2006.01)
(Continued)

(52) U.S. Cl.
CPC ............. *H02J 3/381* (2013.01); *H02J 3/12* (2013.01); *H02J 3/36* (2013.01); *H02M 1/36* (2013.01); *H02P 9/08* (2013.01); *H02J 2300/28* (2020.01)

(58) Field of Classification Search
CPC ...... H02J 3/381; H02J 3/12; H02J 3/36; H02J 2300/28; H02M 1/36; H02P 9/08
(Continued)

(56) References Cited

U.S. PATENT DOCUMENTS

| | | | |
|---|---|---|---|
| 6,340,851 B1* | 1/2002 | Rinaldi | H02P 27/16 307/82 |
| 2008/0037190 A1* | 2/2008 | Datta | H02M 5/271 361/115 |

(Continued)

FOREIGN PATENT DOCUMENTS

EP     3562016 A1     10/2019

OTHER PUBLICATIONS

The EP Search Report for EP application No. 23157061.5, dated Jun. 27, 2023, 10 pages.

(Continued)

*Primary Examiner* — Daniel Cavallari
*Assistant Examiner* — Xuan Ly
(74) *Attorney, Agent, or Firm* — Dority & Manning, P.A.

(57) ABSTRACT

A system and method for pre-charging a DC link of a multi-level power converter, to reduce electrical transients or to decrease a charging current when a converter contactor/disconnect switch is closed, is described. The systems and methods of the present disclosure also provides a new and simplified system for pre-charging a DC link of a multi-level power converter by leveraging a neutral point of a multi-level power converter and a single-line connection to the grid side of the power converter. The DC link charger of the present disclosure, therefore, is capable of reducing the quantity of dedicated superfluous hardware and/or excess resistors, contactors, transformers, fuses, diodes, balancing components, rectifier modules, etc. demanded by conventional systems. Reduced quantities of electronic components and hardware can thereby decrease system costs per unit and lead to significant cost savings.

16 Claims, 12 Drawing Sheets

(51) Int. Cl.
  *H02J 3/38*   (2006.01)
  *H02M 1/36*  (2007.01)
  *H02P 9/08*   (2006.01)

(58) Field of Classification Search
  USPC .......................................................... 307/52
  See application file for complete search history.

(56) References Cited

U.S. PATENT DOCUMENTS

| | | | |
|---|---|---|---|
| 2015/0124496 A1* | 5/2015 | Yu | H02J 3/381 |
| | | | 290/55 |
| 2020/0067437 A1* | 2/2020 | Wagoner | H02P 9/305 |
| 2020/0195168 A1 | 6/2020 | Gloes et al. | |
| 2022/0337147 A1 | 10/2022 | Gercek | |

OTHER PUBLICATIONS

Madhusoodhanan, Sachin et al., Three-phase 4.16 kV medium voltage grid tied AC-DC converter based on 15 kV/40 a Sic IGBTs, 2015 IEEE Energy Conversion Congress and Exposition (ECCE), IEEE, Sep. 20, 2015, pp. 6675-6682.

Mukherjee, Debranjan et al., A Minimum Switch Five-Level Uni-directional Rectifier Without Any Voltage Balancing and Pre-Charging Circuitry, IEEE Transactions on Power Electronics, Institute of Electrical and Electronics Engineers, USA, vol. 34, No. 12, Dec. 1, 2019, pp. 11605-11615.

\* cited by examiner

700 ⇥

┌─────────────────────────────────────────────────┐
│ ELECTRICALLY COUPLING A SINGLE PHASE OF THE POWER CONVERSION ASSEMBLY OF
│ THE MULTI-PHASE POWER SYSTEM TO THE POWER GRID, THE SINGLE PHASE OF THE
│ POWER CONVERSION ASSEMBLY COMPRISING ONE OR MORE ELECTRICAL BRIDGE
│ COMPONENTS                                                              │— 702
└─────────────────────────────────────────────────┘
                              ↓
┌─────────────────────────────────────────────────┐
│ PRE-CHARGING THE DC LINK BY PROVIDING CURRENT TO THE ONE OR MORE ELECTRICAL
│ BRIDGE COMPONENTS OF THE SINGLE PHASE OF THE POWER CONVERSION ASSEMBLY
│ OF THE MULTI-PHASE POWER SYSTEM TO DECREASE THE CHARGING CURRENT DURING │— 704
│ STARTUP OF THE MULTI-PHASE POWER SYSTEM                                 │
└─────────────────────────────────────────────────┘

┌─────────────────────────────────────────────────┐
│ ELECTRICALLY COUPLING A SINGLE PHASE OF THE POWER CONVERSION ASSEMBLY OF
│ THE MULTI-PHASE POWER SYSTEM TO THE POWER GRID, THE SINGLE PHASE OF THE
│ POWER CONVERSION ASSEMBLY COMPRISING ONE OR MORE ELECTRICAL BRIDGE      │— 802
│ COMPONENTS                                                              │
└─────────────────────────────────────────────────┘
                              ↓
┌─────────────────────────────────────────────────┐
│ ELECTRICALLY COUPLING A PORTION OF THE DC LINK TO GROUND                │— 804
└─────────────────────────────────────────────────┘
                              ↓
┌─────────────────────────────────────────────────┐
│ CHARGING THE DC LINK BY PROVIDING CURRENT TO THE ONE OR MORE ELECTRICAL │
│ BRIDGE COMPONENTS IN THE SINGLE PHASE OF THE POWER CONVERSION ASSEMBLY  │— 806
└─────────────────────────────────────────────────┘

FIG. 13

SYSTEM AND METHOD FOR PRE-CHARGING A DC LINK OF A POWER CONVERTER

FIELD

The present disclosure relates generally to wind turbines and more particularly, to a system and method for pre-charging a DC link of a power converter of a wind turbine.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades and the blades transform wind energy into a mechanical rotational torque that drives a low-speed shaft. The low-speed shaft is configured to drive the gearbox that subsequently steps up the low rotational speed of the low-speed shaft to drive a high-speed shaft at an increased rotational speed. The high-speed shaft is generally coupled to the generator so as to rotatably drive a generator rotor. In many wind turbines, the generator may be electrically coupled to a bi-directional power converter that includes a rotor-side converter joined to a line-side converter via a regulated DC link. As such, the generator is configured to convert the rotational mechanical energy to a sinusoidal, three-phase alternating current (AC) electrical energy signal in a generator stator. The rotational energy is converted into electrical energy through electromagnetic fields coupling the rotor and the stator, which is supplied to a power grid via a grid breaker. Thus, the main transformer steps up the voltage amplitude of the electrical power such that the transformed electrical power may be further transmitted to the power grid.

Such wind turbine power systems are generally referred to as a doubly-fed induction generator (DFIG). DFIG operation is typically characterized in that the rotor circuit is supplied with current from a current-regulated power converter. As such, the wind turbine produces variable mechanical torque due to variable wind speeds and the power converter ensures this torque is converted into an electrical output at the same frequency of the grid.

In addition, wind turbine power systems (and solar converters) also often have DC capacitance and this capacitance needs to be charged. For example, such capacitance may be part of a filter to ensure power quality of the power system. There can be a large charging current and the current can cause voltage drops, fuse damage, excessive power loss, and overshoots at the connection point and throughout the power distribution of the wind turbine, thereby causing stress to auxiliaries/accessories in the wind turbine.

Thus, the present disclosure is directed to a system and method for pre-charging the DC link of a power converter to decrease the charging current.

BRIEF DESCRIPTION

Aspects and advantages of the invention will be set forth in part in the following description, or may be obvious from the description, or may be learned through practice of the invention.

In an aspect, the present disclosure is directed to a method for reducing charging current during startup of a multi-phase power system configured for electrically coupling to a power grid. The multi-phase power system has a power conversion assembly with a first converter coupled to a second converter via a DC link. The method includes electrically coupling a single phase of the power conversion assembly of the multi-phase power system to the power grid, the single phase of the power conversion assembly comprising one or more electrical bridge components. The method also includes pre-charging the DC link by providing current to the one or more electrical bridge components of the single phase of the power conversion assembly of the multi-phase power system to decrease the charging current during startup of the multi-phase power system.

In another aspect, the present disclosure is directed to a method for charging a DC link of a power conversion assembly of a multi-phase power system electrically coupled to a power grid. The power conversion assembly has a first converter coupled to a second converter via a DC link. The method includes electrically coupling a single phase of the power conversion assembly of the multi-phase power system to the power grid, the single phase of the power conversion assembly comprising one or more electrical bridge components. The method also includes electrically coupling a portion of the DC link to ground. The method also includes charging the DC link by providing current to the one or more electrical bridge components in the single phase of the power conversion assembly.

In another aspect, the present disclosure is directed to a multi-phase power system configured for electrically coupling to a power grid. The multi-phase power system includes a power conversion assembly comprising a first converter coupled to a second converter via a DC link. A single phase of the power conversion assembly is electrically coupled to the power grid. At least one of the first and second converters of the power conversion assembly comprises one or more electrical bridge components. The multi-phase power system also includes a controller communicatively coupled to the power conversion assembly. The controller is configured to perform one or more operations, the one or more operations comprising pre-charging the DC link via the one or more electrical bridge components of the at least one of the first and second converters of the power conversion assembly to decrease charging current during startup.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 12 illustrates a flow diagram of an embodiment of a method for minimizing charging current during start-up of an AC electrical power system connected to a power grid according to the present disclosure.

FIG. 13 illustrates a flow diagram of another embodiment of a method for minimizing charging current during start-up of an AC electrical power system connected to a power grid according to the present disclosure.

Figure 1:
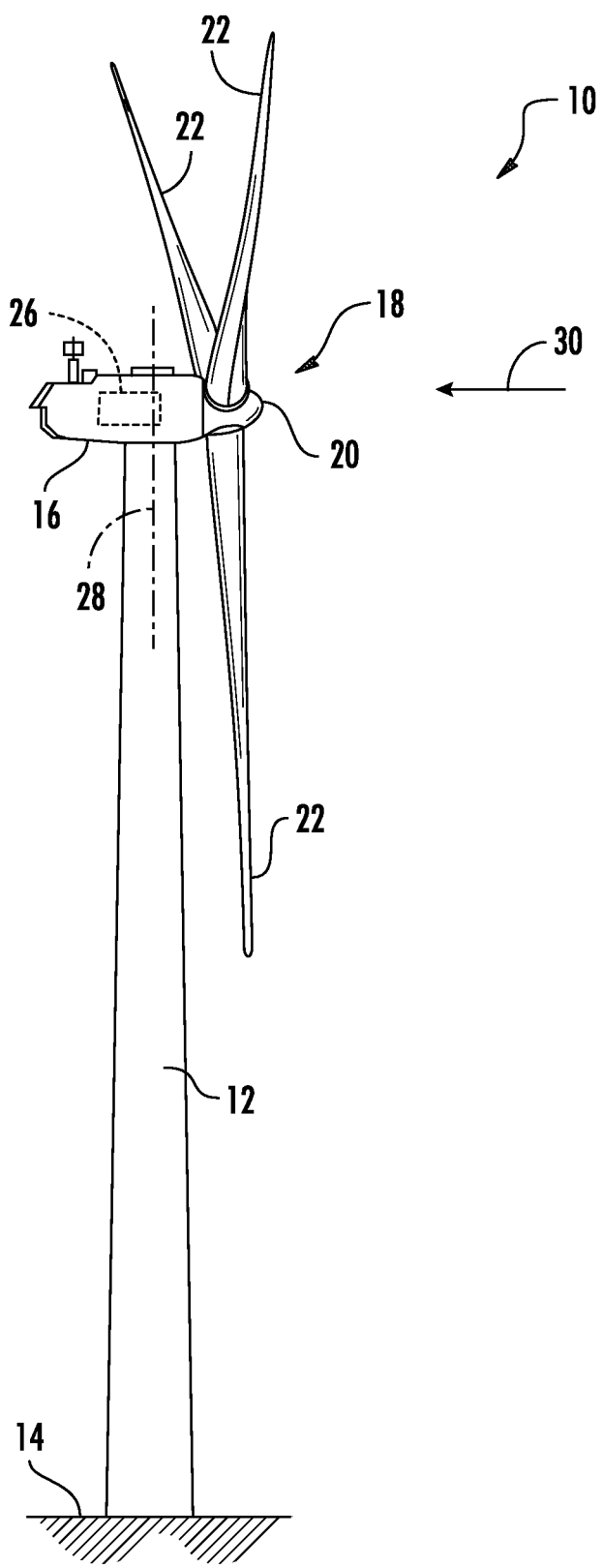
FIG. 1 illustrates perspective view of an embodiment of a power generating asset according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to systems and methods for operating a multi-phase power system, such as that of a wind turbine, configured for electrically coupling to a power grid. The multi-phase power system usually has a two-level or a multi-level power conversion assembly/converter with at least a first converter coupled to a second converter via a DC link, and usually is operably coupled to the power grid via a converter contactor positioned between the first converter and the power grid. Therefore, the present disclosure also is directed to systems and methods for pre-charging a DC link of a two-level or a multi-level power converter to reduce electrical transients or to decrease the charging current when the converter contactor/disconnect switch is closed.

A person having ordinary skill in the art understands that the charging current causes voltage drops and overshoots at the connection point, and throughout the power distribution of the multi-phase power system and recognizes that it is desirable to limit these effects by precluding the development of the charging current when coupling/re-coupling the power converter/power conversion assembly to the power grid. Currently, such pre-charging is accomplished with dedicated DC link pre-charging schemes and hardware, such as a dedicated power supply, or a current limiting circuit, that require resistors, contactors, transformers, fuses, diodes, and/or balancing components and that make any resulting DC link charger or method complicated and expensive.

Accordingly, the present disclosure provides numerous advantages over conventional DC link chargers. For example, the systems and methods of the present disclosure provides a new and simplified architecture and scheme for pre-charging a DC link of a multi-level power converter by leveraging a neutral point of the multi-level power converter and a single-line connection to the grid side of the power converter. The DC link charger of the present disclosure, therefore, is capable of reducing the quantity of dedicated superfluous hardware and/or excess resistors, contactors, transformers, fuses, diodes, balancing components, rectifier modules, etc. demanded by conventional systems. Reduced quantities of electronic components and hardware can thereby decrease system costs per unit and lead to significant cost savings.

For wind turbine embodiments, the present disclosure is directed to systems and methods for operating a multi-phase power generating asset, such as a wound rotor, three-phase, doubly-fed induction generator (DFIG), configured for electrically coupling to a power grid and including a two-level or a multi-level power conversion assembly with a line-side converter coupled to a grid-side converter via a DC link. The multi-level power conversion assembly, for example, may be operably coupled to the power grid via a converter contactor positioned between the line-side converter and the power grid. The converter contactor may include a grid side terminal and a converter side terminal. When the power conversion assembly is coupled to the power grid, power may flow from the power grid and across the terminals of the closed converter contactor. However, whenever the converter contactor is opened to decouple the power conversion assembly from the power grid, the grid side terminal may remain energized by the power grid while the converter side terminal may be deenergized. As such, when the energized grid side terminal is electrically coupled to the de-energized converter side terminal via the closing of the converter contactor, a transient charging current may be developed across the terminals.

In order to preclude the transient current, the systems and methods of the present disclosure also provides an architecture and scheme for pre-charging a DC link of a two-level or a multi-level power conversion assembly by leveraging a ground point on the DC link and a single-line connection to the grid side of the power converter. Specifically, the present disclosure provides for a simplified DC link charger and method of charging the DC link that ties a portion to the DC link to ground (i.e., the DC midpoint on the multi-level power conversion assembly, for example) and one of the phases to the power grid, and that takes advantage of the neutral point to secure a balanced DC link without need for superfluous or dedicated electronic components and hardware (e.g., excess resistors, contactors, transformers, fuses, diodes, balancing components, rectifier modules, etc.). By using a ground connection on the converter DC link, a return path for one of the AC phases is created. The DC link charger for a wind turbine of the present disclosure, therefore, results in direct saving of about $250 in savings per power convert and of about $300 to about $350 in savings per wind turbine, which is significant in the art.

Figure 5:
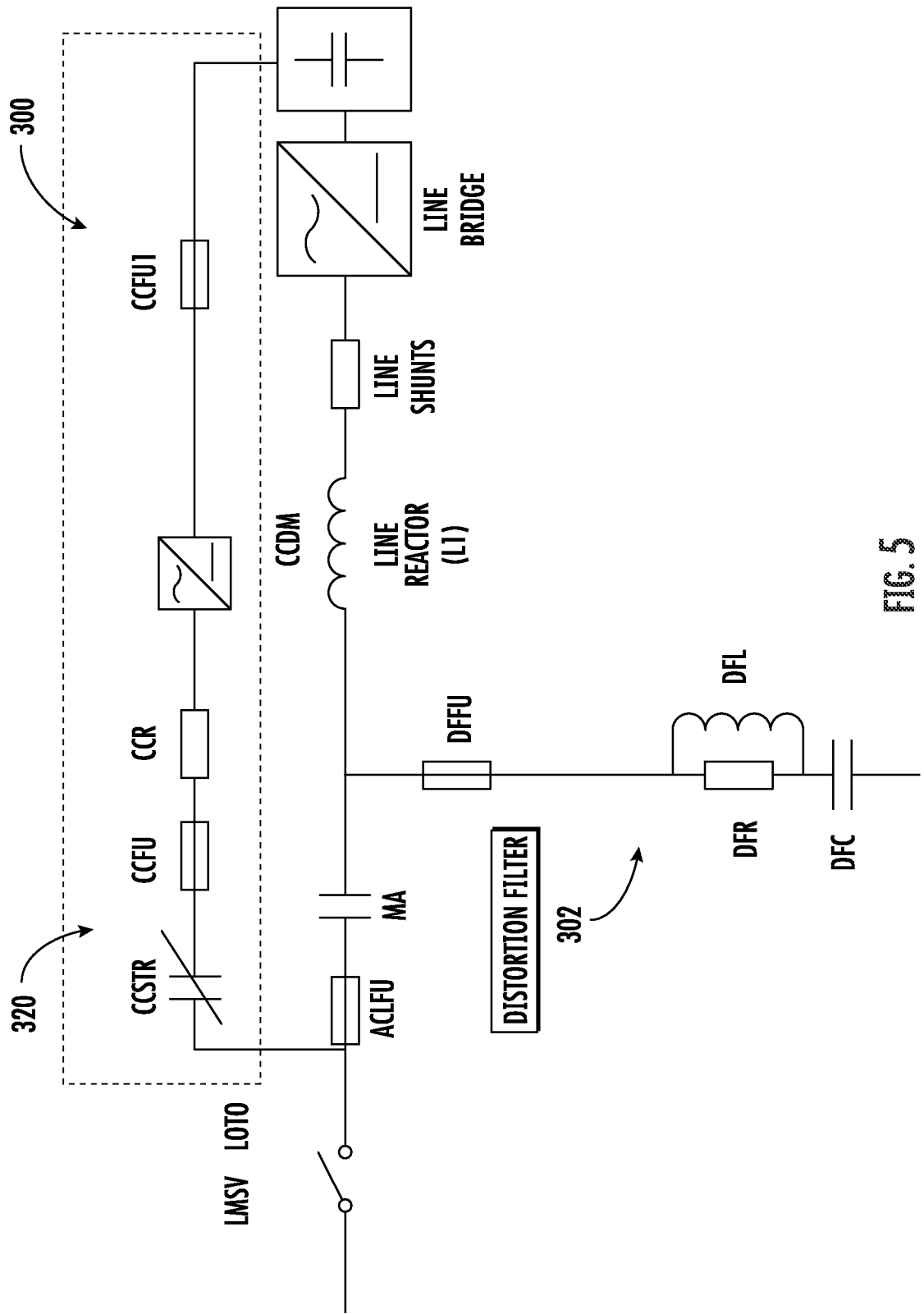
FIG. 5 illustrates a partial, schematic diagram of an embodiment of a conventional charging sub-system used for pre-charging a DC link of a power converter in accordance with aspects of the present disclosure.

In another embodiment, the present disclosure is directed to systems and methods for pre-charging the DC link on a three-level (3L) power conversion assembly that is on a ground referenced electrical system (i.e., the grounded secondary of any power converter connected to a transformer with a wye connection) and that includes a distortion filter for resolving harmonic distortion and to further shape/condition the grid voltage prior to delivery to the line-side converter (see FIG. 5). The distortion filter may be positioned between the converter contactor and the line-side converter but other configurations are envisioned. Specifically, the present disclosure provides for a DC link charger and method of charging the DC link that (1) ties a portion to the DC link to the DC midpoint of the 3L power converter, (2) ties one of the phases to the power grid, and (3) provides a decoupling contactor for decoupling one phase of the converter from the distortion filter. In a related embodiment, the present disclosure provides for a DC link charger and method of charging the DC link that leverages the distortion filter(s) as a series impedance to charge the DC link via a current limiting impedance. In another related embodiment, the present disclosure provides for a DC link charger and method of charging the DC link that yields further cost savings by using any available power converter recovery diodes in the system instead of any dedicated rectifier modules.

Referring now to the drawings, FIG. 1 illustrates perspective view of an embodiment of a power generating asset 10 according to the present disclosure. As shown, the power generating asset 10 may be configured as a wind turbine. In an additional embodiment, the power generating asset 10 may, for example, be configured as a solar power generating asset, a hydroelectric plant, a fossil fuel generator, and/or a hybrid power generating asset.

When configured as a wind turbine, the power generating asset 10 may generally include a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in alternative embodiments, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown in the embodiment of FIG. 1, the wind turbine 10 includes a turbine control system or turbine controller 26 centralized within the nacelle 16. However, it should be appreciated that the turbine controller 26 may be disposed at any location on or in the wind turbine 10, at any location on the support surface 14 or generally at any other location. As is described below with reference to FIG. 3, the turbine controller 26 may generally comprise any suitable processing unit configured to perform the functions described herein. Thus, in several embodiments, the turbine controller 26 may include suitable computer-readable instructions that, when implemented, configure the controller 26 to perform various different actions, such as transmitting and executing wind turbine control signals.

By transmitting and executing wind turbine control signals, the turbine controller 26 (FIG. 4) may generally be configured to control the various operating modes (e.g., start-up or shut-down sequences) and/or components of the wind turbine 10. For example, the controller 26 may be configured to control the yaw direction of the nacelle 16 about a yaw axis 28 to position the rotor blades 22 with respect to the direction 30 of the wind, thereby controlling the load and power output generated by the wind turbine 10. Similarly, the controller 26 may be configured to control the pitch of the individual rotor blades 22 with respect to the direction 30, or to control operation of electric components, sub-systems, or systems of the wind turbine 10.

Figure 2:
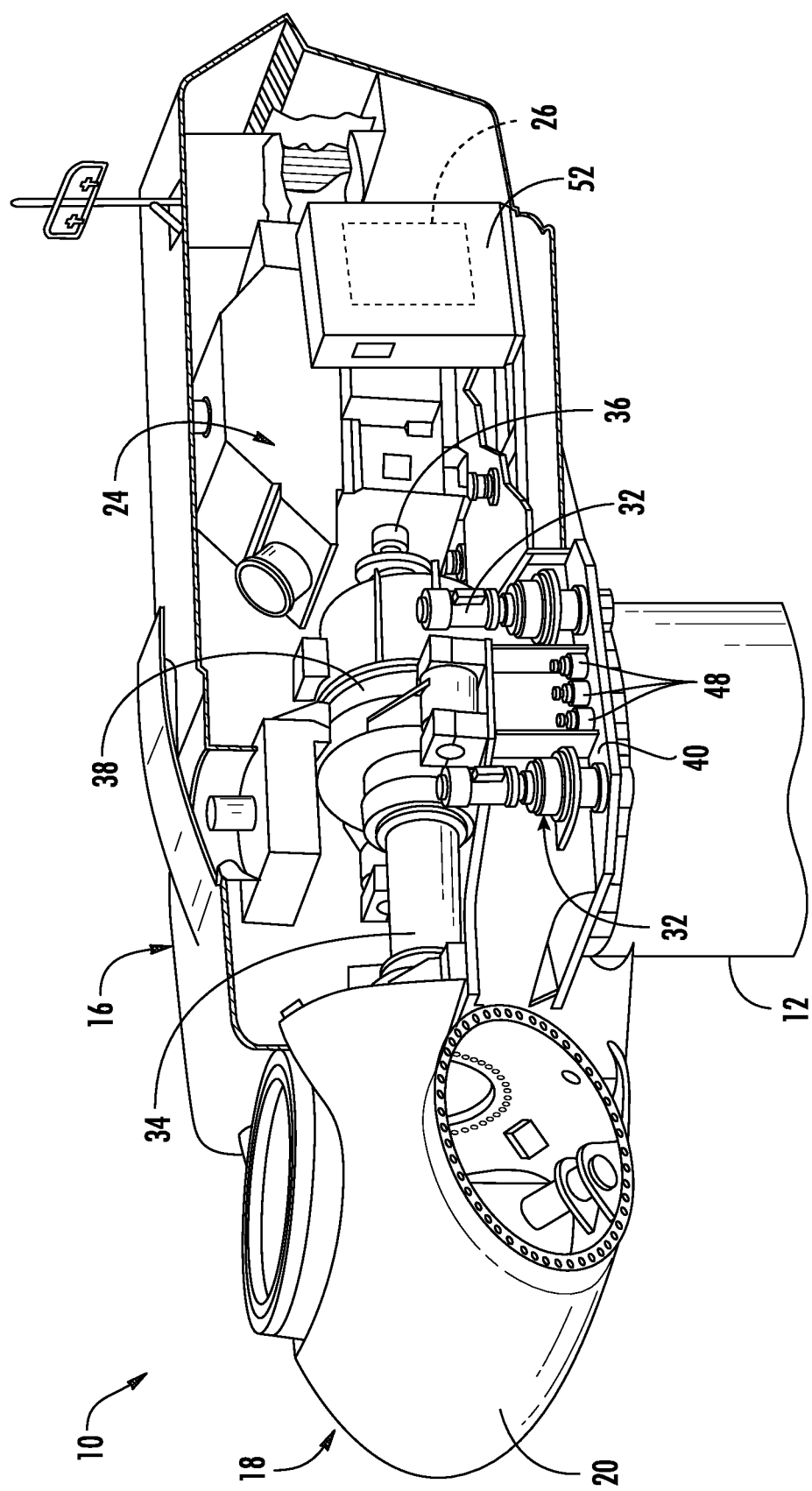
FIG. 2 illustrates a simplified, internal view of an embodiment of the nacelle of the wind turbine shown in FIG. 1.

Referring now to FIG. 2, a simplified, internal view of one embodiment of the nacelle 16 of the wind turbine 10 is illustrated. As shown, a generator 24 is disposed within the nacelle 16. In general, the generator 24 is coupled to the rotor 18 of the wind turbine 10 for generating electrical power from the rotational energy generated by the rotor 18. The rotor 18 may include a rotor shaft 34 coupled to the hub 20 for rotation therewith. The generator 24 may then be coupled to the rotor shaft 34 such that rotation of the rotor shaft 34 drives the generator 24. In the illustrated embodiment of FIG. 2, the generator 24 includes a generator shaft 36 rotatably coupled to the rotor shaft 34 through a gearbox 38. However, in other embodiments, it should be appreciated that the generator shaft 36 may be rotatably coupled directly to the rotor shaft 34. Alternatively, the generator 24 may be directly rotatably coupled to the rotor shaft 34 (often referred to as a "direct-drive wind turbine").

Additionally, the wind turbine 10 may include one or more yaw drive mechanisms 32 optionally mounted to and/or through a bedplate support frame 40 positioned atop the wind turbine tower 12. In particular, in the illustrated embodiment of FIG. 2, each yaw drive mechanism 32 is mounted to and through the bedplate support frame 40. The wind turbine 10 also includes a plurality of yaw brake assemblies 48 for controlling the rotation of the nacelle 16 about the yaw axis 28. The yaw brake assemblies 48 are mounted to and/or through the bedplate support frame 40.

Additionally, the turbine controller 26 may also be located within the nacelle 16. For example, as shown in the illustrated embodiment, the turbine controller 26 is disposed within a control cabinet 52 mounted to a portion of the nacelle 16. However, in other embodiments, the turbine controller 26 may be disposed at any other suitable location on and/or within the wind turbine 10 or at any suitable location remote to the wind turbine 10. Moreover, the turbine controller 26 may also be communicatively coupled to various components of the wind turbine 10 for generally controlling the wind turbine 10 and systems or components described in the present disclosure.

Figure 3:
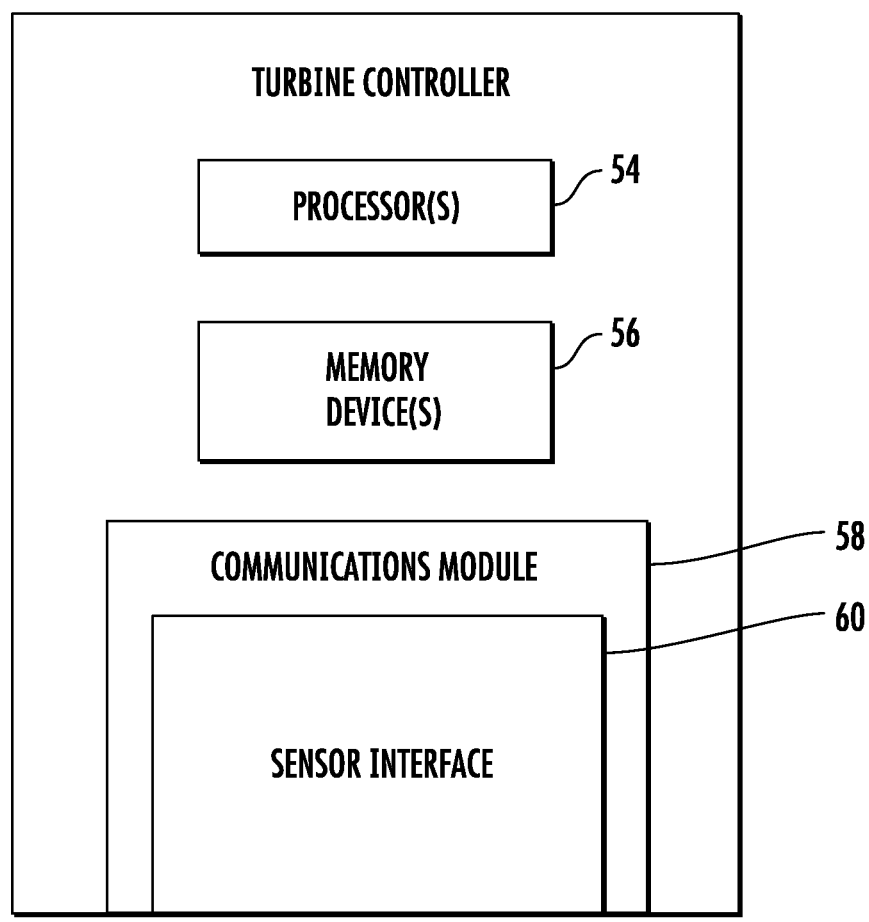
FIG. 3 illustrates a schematic diagram of an embodiment of a turbine controller of a wind turbine in accordance with aspects of the present disclosure.

Referring now to FIG. 3, there is illustrated a block diagram of one embodiment of the turbine controller 26 of the wind turbine 10. In general, the turbine controller 26 may comprise a computer or any other suitable processing unit. Thus, in several embodiments, the turbine controller 26 may include one or more processor(s) 54 and associated memory device(s) 56 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 56 of the turbine controller 26 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 56 may generally be configured to store suitable computer-readable instructions that, when implemented by the processor(s) 54, configure the turbine controller 26 to perform various methods and/or steps described in detail herein. The memory device(s) 56 may also be used to store temporary input and output variables and other immediate information during execution by the processor(s) 54 of the computer-readable instructions.

Additionally, as shown in FIG. 3, the turbine controller 26 may also include a communications module 58 configured to facilitate communication between the turbine controller 26 and the various components of the wind turbine 10 including the yaw brake assembly(ies) 48. In several embodiments, the communications module 58 may include a sensor interface 60 to permit any sensors 1 of the wind turbine 10 to communicate with the turbine controller 26. For instance, the sensor interface 60 may comprise one or more analog-to-digital converters configured to convert analog signals into digital signals that can be used by the processor(s) 54.

Figure 4:
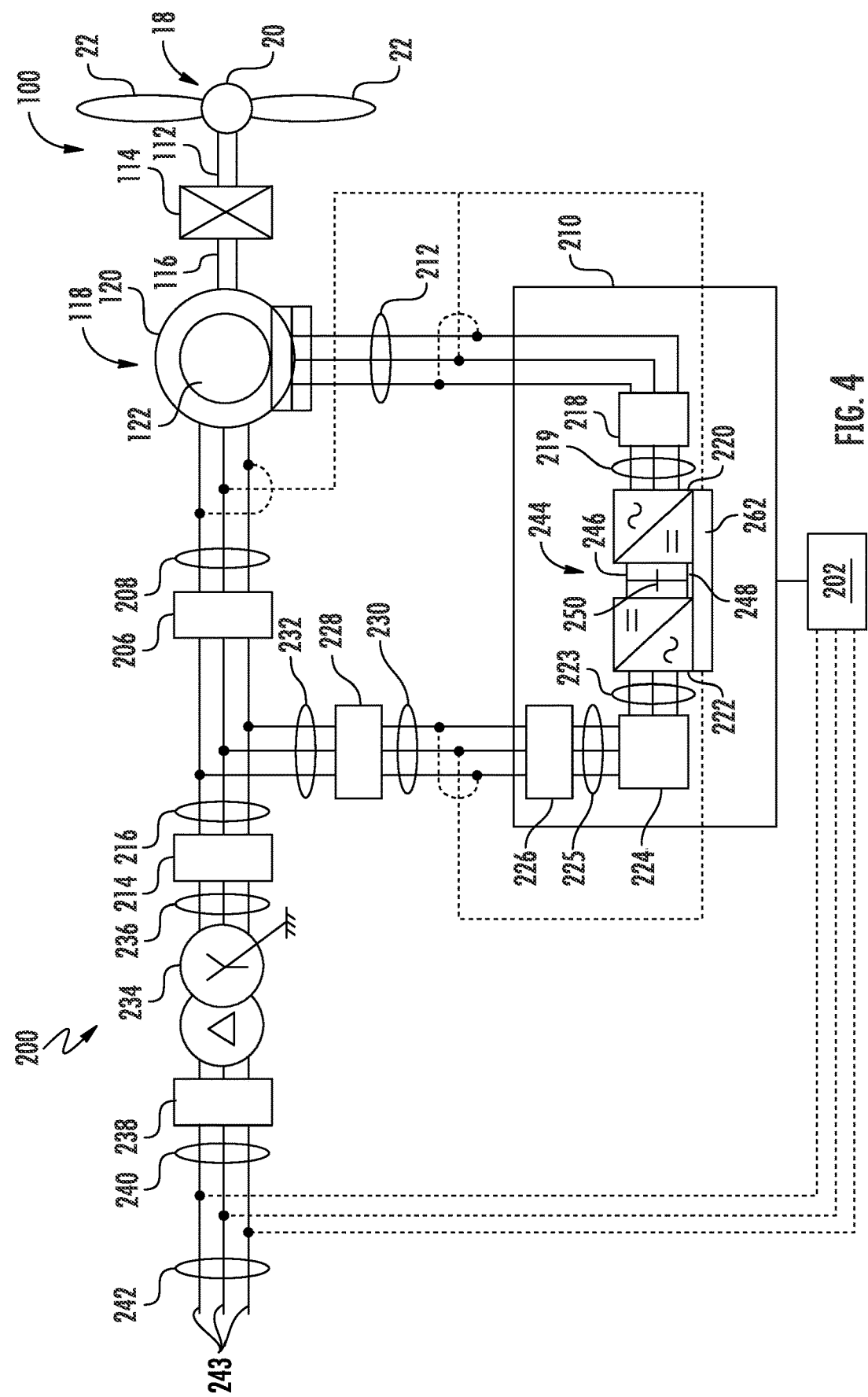
FIG. 4 illustrates a schematic diagram of one embodiment of an electrical power system that may be used with a wind turbine in accordance with aspects of the present disclosure.

Referring now to FIG. 4, a schematic view of one embodiment of an electrical power system 200 that may be used with a wind turbine 10 is illustrated. During operation, wind impacts the blades 22 and the blades 22 transform wind energy into a mechanical rotational torque. Accordingly, the wind turbine 10 may include various components for converting the kinetic energy of the rotor 18 into an electrical output in an acceptable form to a connected power grid 243.

For example, in an embodiment, the mechanical rotational torque rotatably drives a low-speed shaft 112 via the hub 20. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122 having field winding (not shown). More specifically, in an embodiment, the generator 118 may be a wound rotor, three-phase, doubly-fed induction (asynchronous) generator (DFIG) that includes a generator stator 120 magnetically coupled to a generator rotor 122. It should be understood that the electrical power system may also encompass any other suitable power generation system in addition to DFIG systems, including but not limited to permanent magnet generator (PMG) systems and/or any system connected to a power grid that includes a disconnect device, AC capacitance, and a power converter.

As such, a rotating magnetic field may be induced by the generator rotor 122 and a voltage may be induced within a generator stator 120 that is magnetically coupled to the generator rotor 122. In such embodiments, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a power grid 243 via a grid circuit breaker 238, a breaker-side bus 240, and a grid bus 242. In addition, the electrical power system 200 may include a wind turbine controller 26 (FIG. 3) configured to control any of the components of the wind turbine 100 and/or implement the methods or method steps as described herein.

The generator stator 120 may be electrically coupled to a stator synchronizing switch 206 via a stator bus 208. In one embodiment, the generator rotor 122 may be electrically coupled to a bi-directional power conversion assembly 210 or power converter via a rotor bus 212. Alternatively, the generator rotor 122 may be electrically coupled to the rotor bus 212 via any other device that facilitates operation of the electrical power system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. In addition, the rotor filter 218 may include a rotor-side reactor. A rotor filter bus 219 electrically couples the rotor filter 218 to a rotor-side power converter 220. Further, the rotor-side power converter 220 may be electrically coupled to a line-side power converter 222 via a single direct current (DC) link 244. Alternatively, the rotor-side power converter 220 and the line-side power converter 222 may be electrically coupled via individual and/or separate DC links. In addition, as shown, the DC link 244 may include a positive rail 246, a negative rail 248, and at least one capacitor 250 coupled therebetween.

In an embodiment, the rotor side converter 220 and the line-side converter 222 may be configured for normal operating mode in a three-phase, pulse width modulation (PWM) arrangement using insulated gate bipolar transistors (IGBTs) as switching devices. Other suitable switching devices may be used, such as insulated gate commuted thyristors, MOSFETs, bipolar transistors, silicone-controlled rectifiers, and/or other suitable switching devices.

Returning generally to the embodiment illustrated by FIG. 4, a line-side power converter bus 223 may electrically couple the line-side power converter 222 to a line filter 224. Also, a line bus 225 may electrically couple the line filter 224 to a line contactor 226. The line filter 224 may include a line-side reactor. Moreover, the line contactor 226 may be electrically coupled to a conversion circuit breaker 228 via a conversion circuit breaker bus 230. The conversion circuit breaker 228 may be electrically coupled to the main transformer circuit breaker 214 via system bus 216 and a connection bus 232. Furthermore, the main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

Alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g., three-phase) AC power is provided to the power conversion assembly 210. The rotor-side power converter 220 converts the AC power provided from the rotor bus 212 into DC power and provides the DC power to the DC link 244. Switching elements 245 (e.g., diodes) used in bridge circuits of the rotor side power converter 220 can be modulated to convert the AC power provided from the rotor bus 212 into DC power suitable for the DC link 244.

The line side converter 222 converts the DC power on the DC link 244 into AC output power suitable for the electrical grid bus 242. In particular, switching elements 247 (e.g., IGBTs) used in bridge circuits of the line side power converter 222 can be modulated to convert the DC power on the DC link 244 into AC power on the line side bus 225. The AC power from the power conversion assembly 210 can be combined with the power from the stator 120 to provide multi-phase power (e.g., three-phase power) having a frequency maintained substantially at the frequency of the electrical grid bus 242 (e.g., 50 Hz/60 Hz).

It should be understood that the rotor-side power converter 220 and the line-side power converter 222 may have any configuration using any switching devices that facilitate operation of electrical power system 200 as described herein.

Further, the power conversion assembly 210 may be coupled in electronic data communication with the turbine controller 26 and/or a separate or integral converter controller 202 to control the operation of the rotor-side power converter 220 and the line-side power converter 222. The converter controller 202 may be identical or similarly configured as the controller 26 described in detail herein. Further, during operation, the controller 202 may be configured to receive one or more voltage and/or electric current measurement signals of voltage and electric current. Thus, the controller 202 may be configured to monitor and control at least some of the operational variables associated with the wind turbine 100.

In certain embodiments, during start-up of the power system, the grid filter is not connected to the grid (i.e., the line contactor is open). Therefore, once the DC link is charged, the line contactor is closed, and the grid filter begins producing reactive power. Thus, a voltage spike can occur and travel through to the auxiliary power system. As such, certain conventional systems can experience large charging current upon start-up of the system, while other convention system can experience electrical transients. Accordingly, the present disclosure is directed to an improved systems and methods for pre-charging a DC link of a multi-level power converter to reduce electrical transients or to decrease the inrush current when the converter contactor/disconnect switch is closed.

Referring now to FIG. 5, a partial, schematic diagram of an embodiment of a conventional charging scheme/subsystem 300 used for pre-charging a DC link of a power converter, such as the multi-level power conversion assembly 210 of the multi-phase power generating asset 10 of FIGS. 1-4. The charging sub-system 300 includes a dedicated charging branch 320 and an optional distortion filter 302 depending on the type of power converter being worked with. The charging branch 320 commonly takes the form of a dedicated power supply providing a controlled pre-charge scheme for the DC link, or a dedicated pre-charge circuit(s)/resistor(s)/transformer(s) with diodes (the diodes optionally in series).

Figure 6:
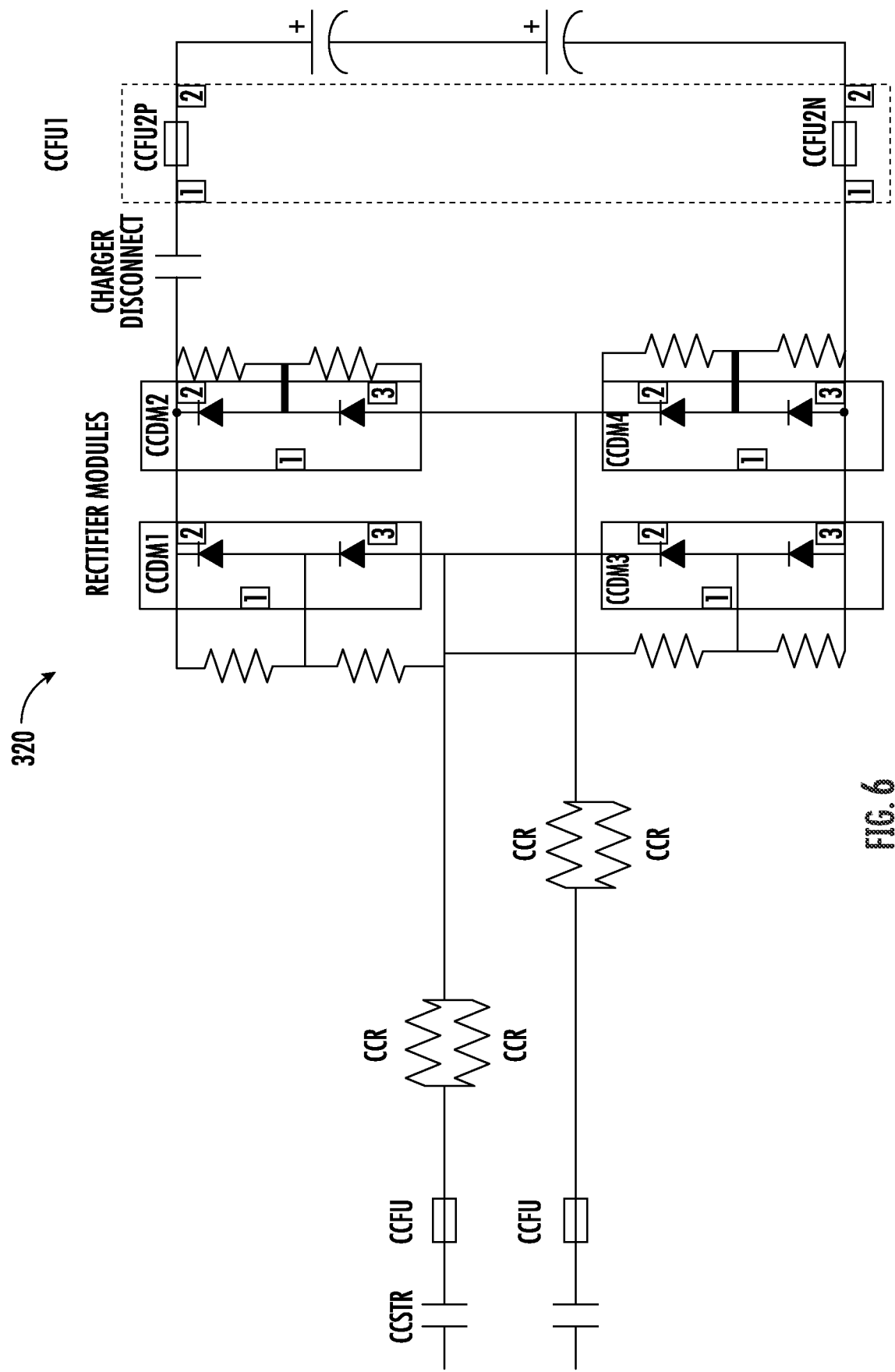
FIG. 6 illustrates an embodiment of an embodiment of a conventional, dedicated charging branch used for pre-charging a DC link in accordance with aspects of the present disclosure.

Referring now to FIG. 6, an embodiment of a conventional dedicated charging branch 320 is illustrated. Specifically, the charging branch 320 of FIG. 6 is characterized by having diodes in series for medium and high voltage applications.

Figure 7:
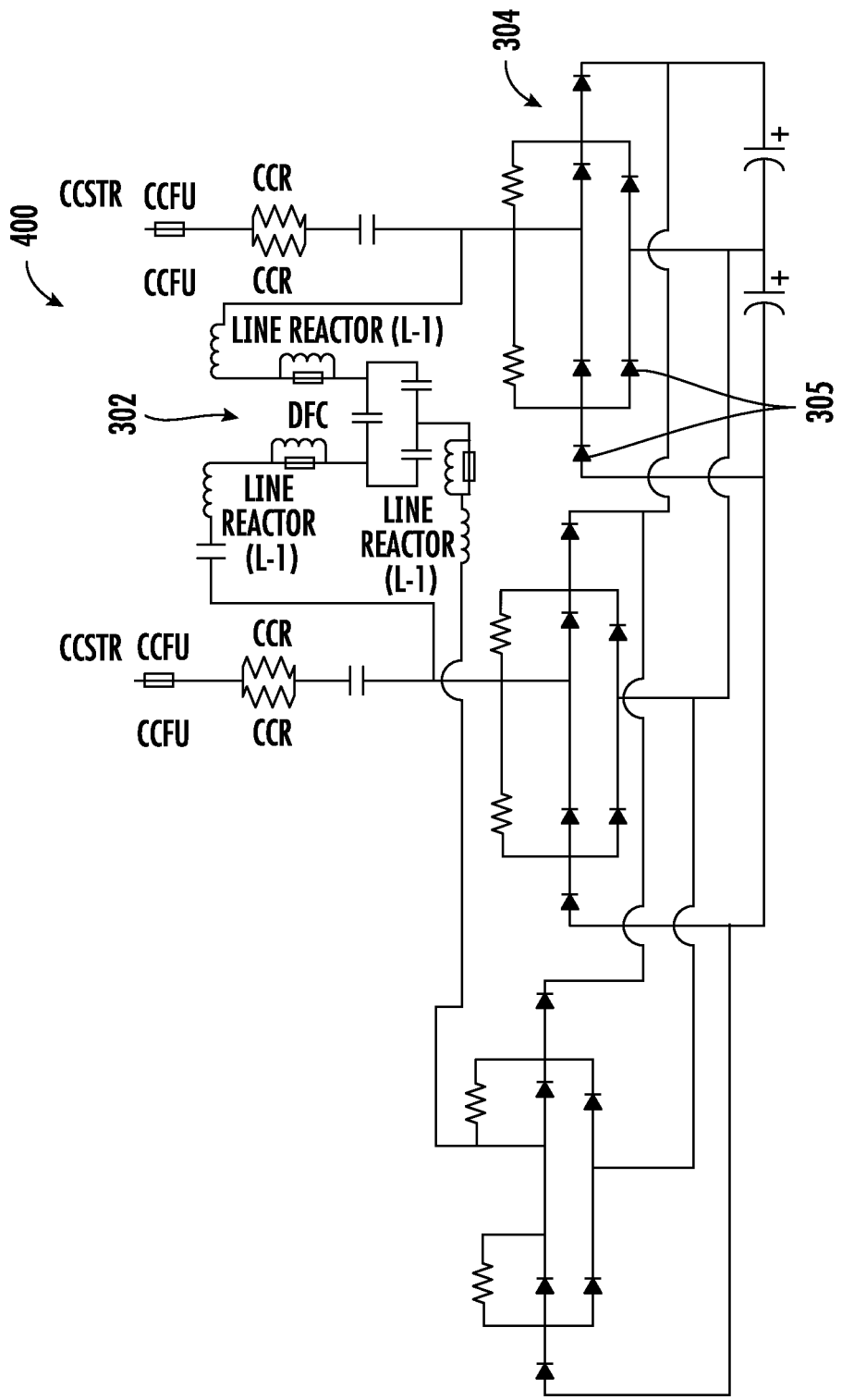
FIG. 7 illustrates a partial, schematic diagram of an embodiment of a charging system for pre-charging a DC link of a power converter in accordance with aspects of the present disclosure.

Referring now to FIG. 7, a partial, schematic diagram of an embodiment of a charging scheme/system 400 that is a logical extension/iteration/improvement to 320 for pre-charging a DC link of a power converter, such as the multi-level power conversion assembly 210 of the multi-phase power generating asset 10 of FIGS. 1-4. The charging system 400 is such that the dedicated diodes of 320 are replaced by the bridge freewheeling diodes. The charging system 400 may include an entirely optional distortion filter 302, and a phase of the power convert 210 comprising one or more non-dedicated electrical bridge components 304. Specifically, the charging system 400 is simplified and refined by eliminating the dedicated charging diodes and balancing resistors.

Figure 8:
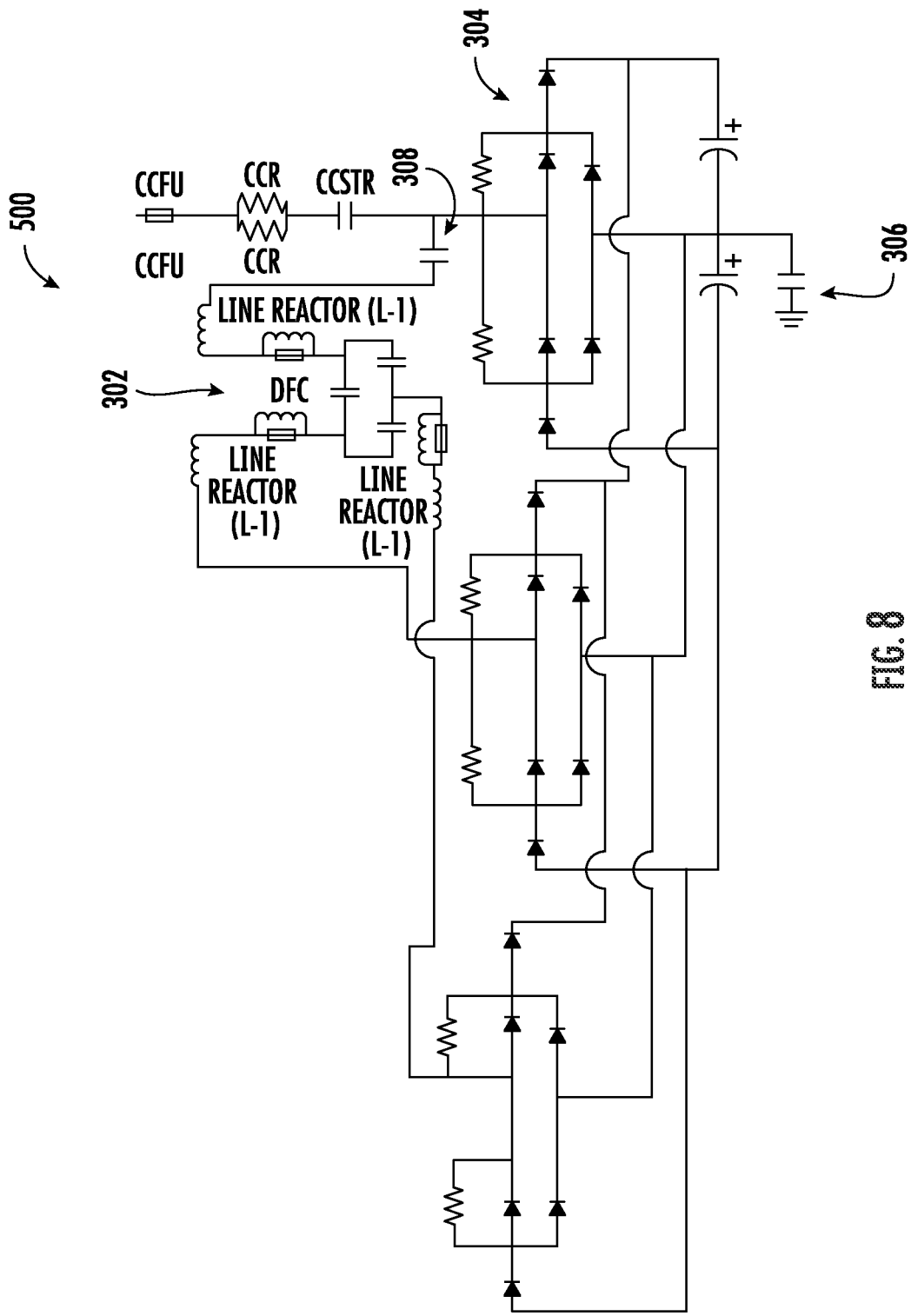
FIG. 8, illustrates a partial, schematic diagram of another embodiment of a charging system for pre-charging a DC link of a power converter in accordance with aspects of the present disclosure.

Referring now to FIG. 8, a partial, schematic diagram of an embodiment of a new charging scheme/system 500 for pre-charging a DC link of a power converter, such as the multi-level power conversion assembly 210 of the multi-phase power generating asset 10 of FIGS. 1-4. The charging system 500 includes an optional distortion filter 302, and a phase of the power convert 210 comprising one or more non-dedicated electrical bridge components 304. The charging system 500 also is tied to a transformer (not shown) with a grounded Wye. The charging system 500 establishes a neutral point of the multi-level power converter 210 and a single-line connection to the grid side of the power converter 210, and leverages the non-dedicated diode(s) 305 of the non-dedicated bridge component 304, to eliminate dependence on any dedicated pre-charging diodes or balancing resistors, for example. Specifically, the charging system 500 may establish a ground point 306 on the DC link 244, and a single-line connection to the grid side of the power converter 210. As such, the charging system 500 ties a portion of the DC link to ground 306, ties one of the phases to the power grid 243, and provides a decoupling contactor 308 for decoupling the distortion filter 302 (which allows for temporary connections between the neutral point and the ground point 306). By using a ground connection on the converter DC link and the decoupling contactor 308, a return path for one of the AC phases is created (see FIG. 10). The charging system 500, therefore, takes advantage of the neutral point to secure a balanced DC link and eliminates the need for superfluous pre-charge resistors, contactors, diodes, and fuses (compare FIG. 7 and FIG. 8). In an embodiment where the multi-phase power generating asset 10 includes a 3L power conversion assembly 210 that is on a ground referenced electrical system, the system 500 uses the grounded secondary connected to the transformer 234.

Figure 9:
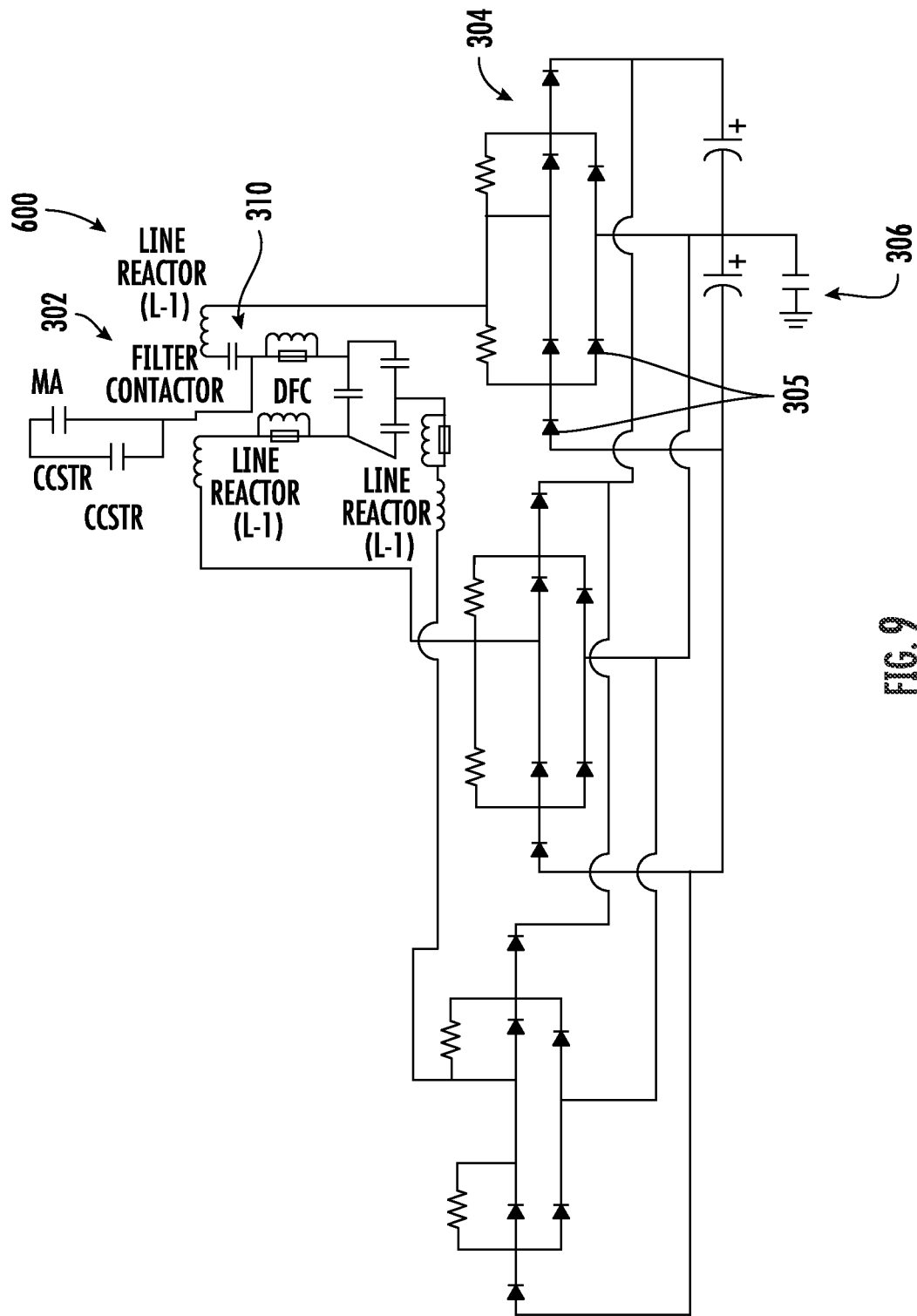
FIG. 9 illustrates a partial, schematic diagram of an embodiment of a charging system for pre-charging a DC link of a power converter in accordance with aspects of the present disclosure.

Referring now to FIG. 9, a partial, schematic diagram of another embodiment of a new charging scheme/system 600 for pre-charging a DC link of a power converter, such as the multi-level power conversion assembly 210 of the multi-phase power generating asset 10 of FIGS. 1-4. The charging system 600 includes a non-optional distortion filter 302 positioned between the contactor 226, a disconnect contactor to decouple one of the converter phases 310 and the line-side converter 222, and a phase of the power convert 210 comprising one or more non-dedicated electrical bridge components 304. The distortion filter 302 is configured to help resolve harmonic distortions and to further condition the grid-side voltage prior to delivery to the line side converter 222; however, other non-DC link pre-charging functions are envisioned. Specifically, the charging system 600 establishes a ground point 306 on the DC link 244, and a single-line connection to the grid side of the power converter 210. As such, the charging system 500 ties a portion of the DC link to ground 306 and ties one of the phases to the power grid 243. By using a ground connection on the converter DC link, a return path for one of the AC phases is created (see FIG. 11) and the distortion filter 302 can be used as the pre-charging impedance. The charging system 600, therefore, takes advantage of the neutral point to secure a balanced DC link and further eliminates the need for superfluous pre-charge resistors, contactors, diodes, and fuses (compare FIG. 8 and FIG. 9). In an embodiment where the multi-phase power generating asset 10 includes a 3L power conversion assembly 210 that is on a ground referenced electrical system, the system 600 may include a main inductor disconnect point, which allows a temporary connection to be established between the neutral point and the ground point 306.

Figure 10:
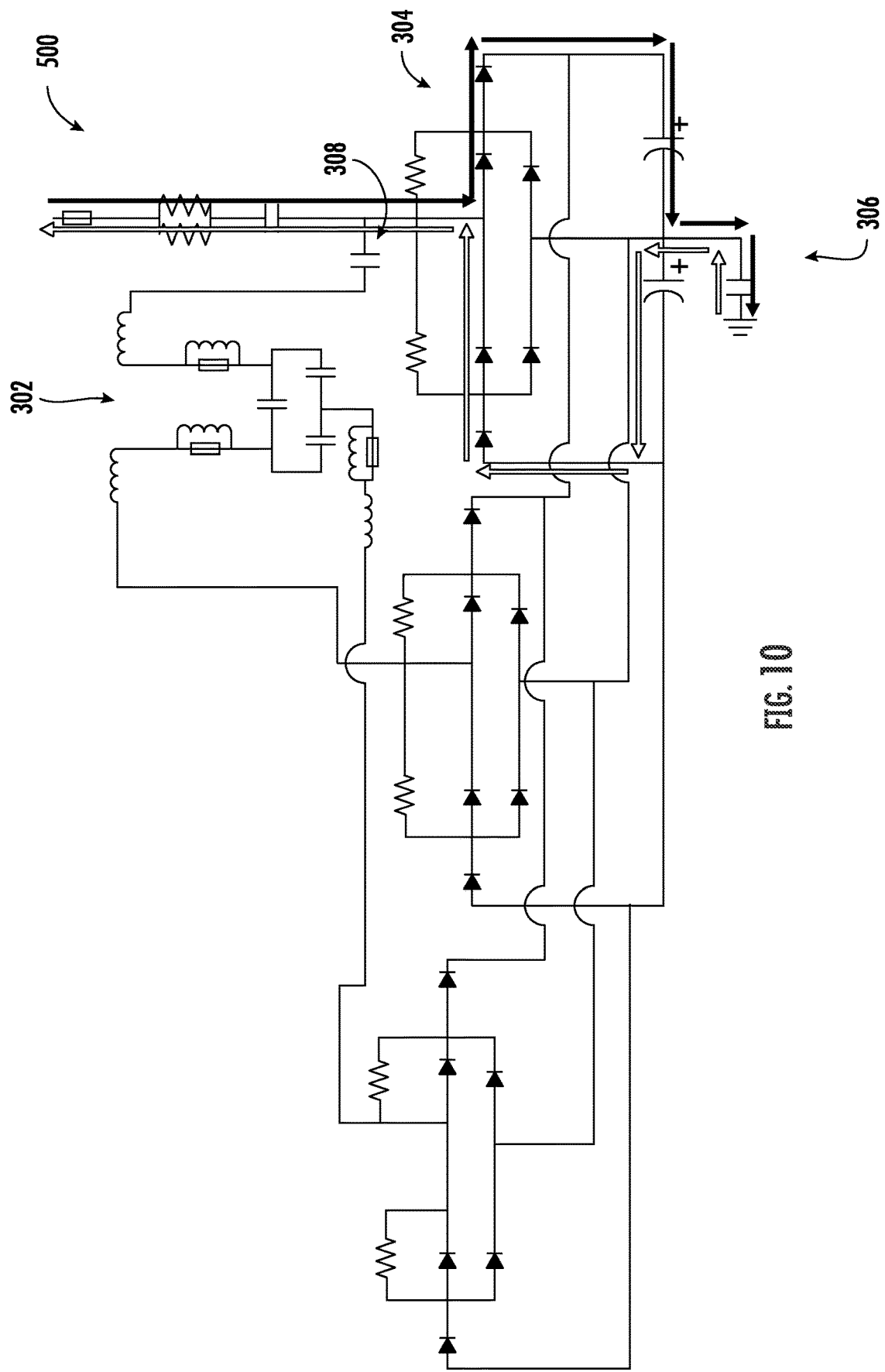
FIG. 10 illustrates a current flow path for the partial, schematic diagram of FIG. 8 in accordance with aspects of the present disclosure.

Referring now to FIG. 10, a current flow path for the partial, schematic diagram of FIG. 8 is shown. No current flows through the optional distortion filter 302; however, there is a ground point 306.

Figure 11:
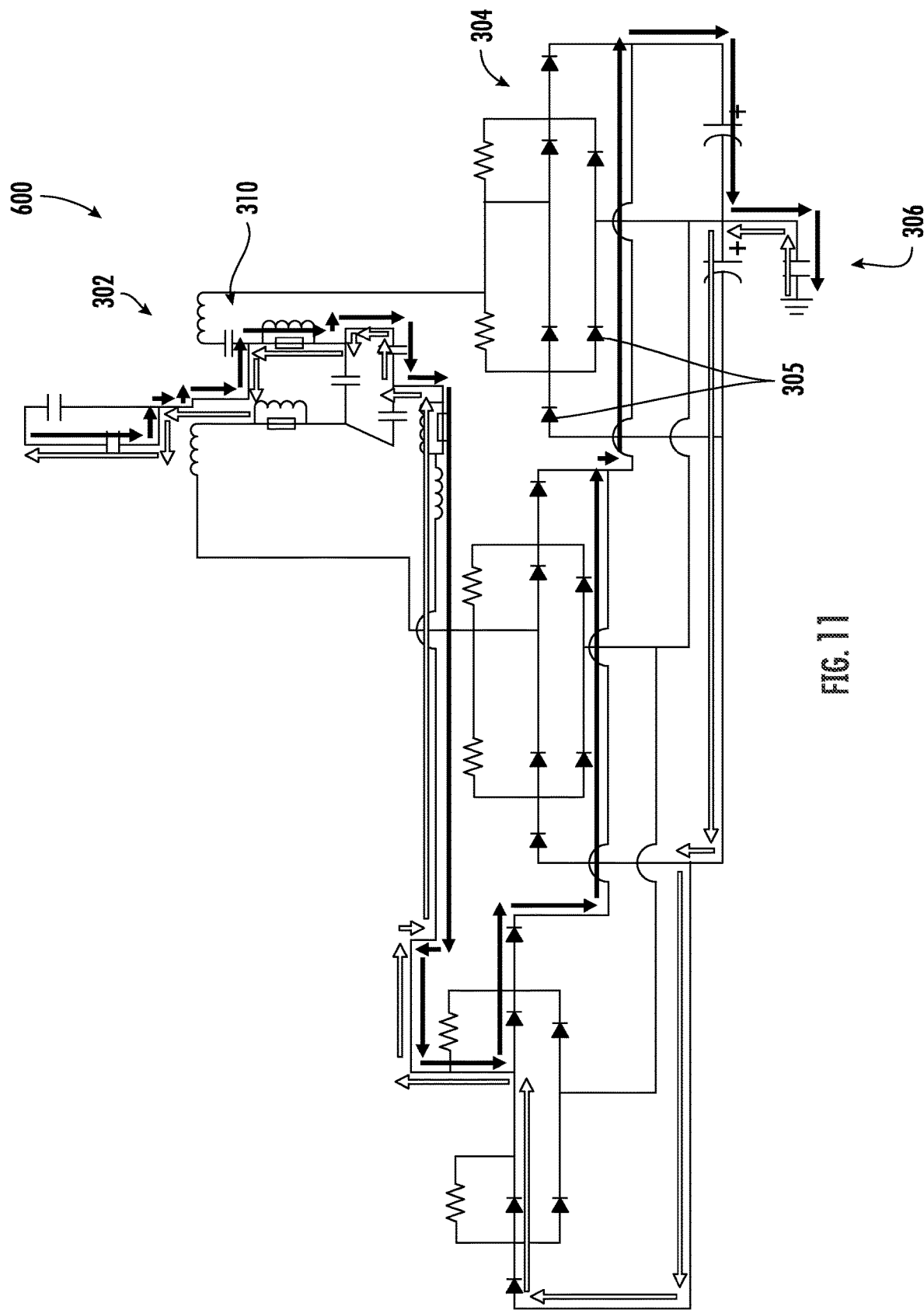
FIG. 11 illustrates a current flow path for the partial, schematic diagram of FIG. 9 in accordance with aspects of the present disclosure.

Referring now to FIG. 11, a current flow path for the partial, schematic diagram of FIG. 9 is shown. Current flows through the modified distortion filter 302 and there is a ground point 306.

Referring now to FIG. 12, a flow diagram of an embodiment of a method 700 for minimizing charging current during start-up of an AC electrical power system connected to a power grid is illustrated. The method may be implemented using the system 400, 500, or 600 discussed herein with references to FIGS. 1-11. FIG. 12 depicts steps performed in a particular order for purposes of illustration and discussion. Those of ordinary skill in the art, using the disclosures provided herein, will understand that various steps of the method 700 or any of the other methods disclosed herein may be adapted, modified, rearranged, performed simultaneously, or modified in various ways without deviating from the scope of the present disclosure.

As shown at (702), the method includes electrically coupling a single phase of the power conversion assembly of the multi-phase power system to the power grid, the single phase of the power conversion assembly comprising one or more electrical bridge components. As shown at (704), the method also includes pre-charging the DC link by providing current to the one or more electrical bridge components of the single phase of the power conversion assembly of the multi-phase power system to decrease the charging current during startup of the multi-phase power system.

Referring now to FIG. 13, a flow diagram of another embodiment of a method 800 for minimizing charging current during start-up of an AC electrical power system connected to a power grid is illustrated. The method may be implemented using the system 400, 500, or 600 discussed herein with references to FIGS. 1-11. FIG. 13 depicts steps performed in a particular order for purposes of illustration and discussion.

As shown at (802), the method includes electrically coupling a single phase of the power conversion assembly of the multi-phase power system to the power grid, the single phase of the power conversion assembly comprising one or more electrical bridge components. As shown at (804), the method also includes electrically coupling a portion of the DC link to ground. As shown at (806), the method also includes charging the DC link by providing current to the one or more electrical bridge components in the single phase of the power conversion assembly.

A skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for reducing charging current during startup of a multi-phase power system configured for electrically coupling to a power grid, the multi-phase power system having a power conversion assembly with a first converter coupled to a second converter via a DC link, the method comprising:

electrically coupling a single phase of the power conversion assembly of the multi-phase power system to the power grid, the single phase of the power conversion assembly comprising one or more electrical bridge components; and pre-charging the DC link by providing current to the one or more electrical bridge components of the single phase of the power conversion assembly of the multi-phase power system to decrease the charging current during startup of the multi-phase power system.

Clause 2. The method of clause 1, further comprising electrically coupling a portion of the DC link to ground.

Clause 3. The method of clause 2, wherein the power conversion assembly is a multi-level power conversion assembly, and wherein electrically coupling the portion of the DC link to ground further comprises establishing a temporary connection between a DC midpoint of the DC link and ground.

Clause 4. The method of clause 3, further comprising decoupling a grid distortion filter of the multi-phase power system from the single phase via a disconnect switch such that the grid distortion filter is decoupled during the pre-charging the DC link.

Clause 5. The method of clause 4, wherein the one or more electrical bridge components of the power conversion assembly comprises a plurality of bridge diodes of the power conversion assembly.

Clause 6. The method of any of clauses 3-5, further comprising coupling a grid distortion filter of the multi-phase power system to the single phase by closing a disconnect switch such that the grid distortion filter is coupled after the pre-charging the DC link.

Clause 7. The method of clause 6, wherein the one or more electrical bridge components of the power conversion assembly comprises a plurality of bridge diodes of the power conversion assembly and the grid distortion filter.

Clause 8. The method of any of the preceding clauses, wherein the power conversion assembly is grounded on a secondary winding of a grounded wye transformer.

Clause 9. The method of any of the preceding clauses, wherein the multi-phase power system is a wind turbine power system.

Clause 10. The method of clause 9, wherein the first converter is a rotor-side converter and the second converter is a line-side converter of the wind turbine power system.

Clause 11. A method for charging a DC link of a power conversion assembly of a multi-phase power system electrically coupled to a power grid, the power conversion assembly having a first converter coupled to a second converter via a DC link, the method comprising:
  electrically coupling a single phase of the power conversion assembly of the multi-phase power system to the power grid, the single phase of the power conversion assembly comprising one or more electrical bridge components;
  electrically coupling a portion of the DC link to ground; and
  charging the DC link by providing current to the one or more electrical bridge components in the single phase of the power conversion assembly.

Clause 12. A multi-phase power system configured for electrically coupling to a power grid, comprising:
  a power conversion assembly comprising a first converter coupled to a second converter via a DC link, wherein a single phase of the power conversion assembly is electrically coupled to the power grid, at least one of the first and second converters of the power conversion assembly comprising one or more electrical bridge components; and
  a controller communicatively coupled to the power conversion assembly, the controller configured to perform one or more operations, the one or more operations comprising:
    pre-charging the DC link via the one or more electrical bridge components of the at least one of the first and second converters of the power conversion assembly to decrease charging current during startup.

Clause 13. The system of clause 12, wherein a portion of the DC link of the power conversion assembly is coupled to ground.

Clause 14. The system of clause 13, wherein the power conversion assembly is a multi-level power conversion assembly, and wherein a temporary connection is established between a DC midpoint of the DC link of the power conversion assembly and ground.

Clause 15. The system of clause 14, wherein a grid distortion filter of the multi-phase power system is coupled to the single phase of the power conversion assembly via a disconnect switch, and wherein the one or more operations of the controller further comprises decoupling the grid distortion filter during the pre-charging of the DC link.

Clause 16. The system of clause 15, wherein the one or more electrical bridge components of the power conversion assembly comprises a plurality of bridge diodes of the power conversion assembly.

Clause 17. The system of any of clauses 14-16, wherein a grid distortion filter of the multi-phase power system is coupled to the single phase of the power conversion assembly via a disconnect switch, and wherein the one or more operations of the controller further comprises coupling the grid distortion filter after the pre-charging of the DC link.

Clause 18. The system of clause 17, wherein the one or more electrical bridge components of the power conversion assembly comprises a plurality of bridge diodes of the power conversion assembly and the grid distortion filter.

Clause 19. The system of any of the preceding clauses 12-18, wherein the power conversion assembly is grounded on a secondary winding of a wye transformer.

Clause 20 The system of any of the preceding clauses 12-19, wherein the multi-phase power system is a wind turbine power system, and wherein the first converter is a rotor-side converter and the second converter is a line-side converter of the wind turbine power system.

What is claimed is:

1. A method for reducing charging current during startup of a multi-phase power system configured for electrically coupling to a power grid, the multi-phase power system having a power conversion assembly with a first converter coupled to a second converter via a DC link, the method comprising:
  pre-charging the DC link by performing the following:
    electrically and temporarily coupling a portion of the DC link to ground;
    electrically and temporarily coupling a single phase of the power conversion assembly of the multi-phase power system to the power grid, the single phase of the power conversion assembly comprising one or more electrical bridge components;
    providing current from the grid to the one or more electrical bridge components; and
    wherein the temporary coupling of a portion of the DC link to ground establishes a temporary electrical return path for the single phase of the power conversion assembly.

2. The method of claim 1, wherein the power conversion assembly is a multi-level power conversion assembly, and wherein the temporary electrical coupling of the portion of the DC link to ground is between a DC midpoint of the DC link and ground.

3. The method of claim 2, further comprising decoupling a grid distortion filter of the multi-phase power system from the single phase via a disconnect switch such that the grid distortion filter is decoupled during the pre-charging the DC link.

4. The method of claim 3, wherein the one or more electrical bridge components of the power conversion assembly comprises a plurality of bridge diodes of the power conversion assembly.

5. The method of claim 3, further comprising closing the disconnect switch such that the grid distortion filter is coupled after the pre-charging the DC link.

6. The method of claim 5, wherein the one or more electrical bridge components of the power conversion assembly comprises a plurality of bridge diodes of the power conversion assembly and the grid distortion filter.

7. The method of claim 1, wherein the multi-phase power system is a wind turbine power system.

8. The method of claim 7, wherein the first converter is a rotor-side converter and the second converter is a line-side converter of the wind turbine power system.

9. A method for charging a DC link of a power conversion assembly of a multi-phase power system electrically coupled to a power grid, the power conversion assembly having a first converter coupled to a second converter via the DC link, the method comprising:

electrically and temporarily coupling a single phase of the power conversion assembly of the multi-phase power system to the power grid, the single phase of the power conversion assembly comprising one or more electrical bridge components;

electrically and temporarily coupling a portion of the DC link to ground;

providing current to the one or more electrical bridge components in the single phase of the power conversion assembly; and wherein the temporary coupling of a portion of the DC link to ground establishes an electrical return path for the single phase of the power conversion assembly.

10. A multi-phase power system configured for electrically coupling to a power grid, comprising:

a power conversion assembly comprising a first converter coupled to a second converter via a DC link, wherein a single phase of the power conversion assembly is electrically coupled to the power grid, at least one of the first and second converters of the power conversion assembly comprising one or more electrical bridge components; and a controller communicatively coupled to the power conversion assembly, the controller configured to perform operations comprising:

pre-charging the DC link to decrease charging current during startup by performing the following:

electrically and temporarily coupling a portion of the DC link to ground;

electrically and temporarily coupling a single phase of the power conversion assembly of the multi-phase power system to the power grid, the single phase of the power conversion assembly comprising one or more electrical bridge components;

providing current from the power grid to the one or more electrical bridge components; and wherein the temporary coupling of a portion of the DC link to ground establishes a temporary electrical return path for the single phase of the power conversion assembly.

11. The system of claim 10, wherein the power conversion assembly is a multi-level power conversion assembly, and wherein the temporary ground connection is established between a DC midpoint of the DC link and ground.

12. The system of claim 11, wherein a grid distortion filter of the multi-phase power system is coupled to the single phase of the power conversion assembly via a disconnect switch, and wherein the operations of the controller further comprise decoupling the grid distortion filter during the pre-charging of the DC link.

13. The system of claim 12, wherein the one or more electrical bridge components of the power conversion assembly comprises a plurality of bridge diodes.

14. The system of claim 11, wherein a grid distortion filter of the multi-phase power system is coupled to the single phase of the power conversion assembly via a disconnect switch, and wherein the operations of the controller further comprise coupling the grid distortion filter after the pre-charging of the DC link.

15. The system of claim 14, wherein the one or more electrical bridge components of the power conversion assembly comprises a plurality of bridge diodes of the power conversion assembly and the grid distortion filter.

16. The system of claim 10, wherein the multi-phase power system is a wind turbine power system, and wherein the first converter is a rotor-side converter and the second converter is a line-side converter of the wind turbine power system.

* * * * *